United States Patent [19]

Takahashi et al.

[11] 4,120,841
[45] Oct. 17, 1978

[54] LEVELLING AGENT FOR AQUEOUS PAINTS

[75] Inventors: Hiroshi Takahashi, Nishinomiya; Seizaburo Hirai, Takatsuki; Toshio Abo, Ibaraki, all of Japan

[73] Assignee: Nippon Paint Co., Ltd., Osaka, Japan

[21] Appl. No.: 805,436

[22] Filed: Jun. 10, 1977

Related U.S. Application Data

[63] Continuation-in-part of Ser. No. 678,900, Apr. 21, 1976, abandoned.

[30] Foreign Application Priority Data

Apr. 21, 1975 [JP] Japan .................................. 50-48990

[51] Int. Cl.² ...................... C08L 23/26; C08L 23/36
[52] U.S. Cl. ...................... 260/29.6 H; 260/29.6 HN; 260/29.6 N; 260/29.6 M; 428/336; 428/463; 526/15; 526/16; 526/47.9; 526/49; 526/317
[58] Field of Search ................. 260/29.6 H, 29.6 HN, 260/29.6 N

[56] References Cited

U.S. PATENT DOCUMENTS

| 2,244,703 | 6/1941 | Hubbuch | 526/16 |
| 3,436,378 | 4/1969 | Azorlosa et al. | 526/15 |
| 3,728,314 | 4/1973 | Blank | 526/16 |

FOREIGN PATENT DOCUMENTS 815,089  6/1969  Canada ...................................... 526/16

*Primary Examiner*—Stanford M. Levin
*Attorney, Agent, or Firm*—Wenderoth, Lind & Ponack

[57] ABSTRACT

A levelling agent for use in aqueous paints is composed of a copolymer of a monoethylenically, alpha, beta-unsaturated carboxylic acid or anhydride thereof and an alkyl acrylate or alkyl methacrylate having in each case from 1 to 18 carbon atoms in the alkyl moiety, the copolymer having an average molecular weight of from about 2,000 to 80,000 and an acid value of from about 30 to 200, the carboxyl groups of the said copolymer being completely or substantially completely neutralized with a base. The levelling agent, when used with an aqueous paint, possesses improved gloss on the painted surface and re-coating properties for coating with another aqueous paint.

13 Claims, No Drawings

LEVELLING AGENT FOR AQUEOUS PAINTS

This is a continuation-in-part application of our copending application Ser. No. 678,900, filed Apr. 21, 1976, now abandoned.

The present invention relates to a levelling agent for use in an aqueous paint. More particularly, the present invention relates to a levelling agent which can improve or prevent defects on the surface of the coating of aqueous paints, such as craters or cissing. The levelling agents of the present invention are provided with a combined property of improved gloss on the coating surface and the re-coating of the coating surface with another aqueous paint.

Aqueous paints have advantages with respect to prevention of atmospheric pollution, security against fire or explosion and sanitary application under conditions free from malodor because they contain organic solvents in considerably lower concentrations than do conventional organic solvent-type paints. From these advantages, aqueous paints have been used in increasing amounts in various fields. The aqueous paints, however, have some disadvantages which are associated with the use of water as a medium. The water may present defective results on the surface of the coating because of its high surface tension and may provide the coating with surface defects such as craters or cissing. These defects on the coating surface impair the appearance of the coating and decrease its coating efficiency to a considerable extent. Heretofore, however, there has been little improvement of levelling agents useful for improving such defects inherent in aqueous paints. Water-soluble silicone resins and fluorine-containing surfactants have been used for this purpose. However, these materials may not exhibit satisfactory effects as levelling agents and this is particularly so with respect to their lack of ability to be re-coated with aqueous paints. For levelling agents for use in solvent-type paints, it is known that alkyl acrylate or alkyl methacrylate polymers have been used, such as described in Japanese Patent Publication No. 9570/1969. It has been found, however, that these levelling agents cannot present desired effects on aqueous paints.

It is therefore an object of the present invention to provide a levelling agent for use in aqueous paints.

Another object of the present invention is to provide a levelling agent which can provide the coating of an aqueous paint with improved surface gloss and properties to be re-coated with an aqueous paint thereon.

A further object of the present invention is to provide a levelling agent which can improve the disadvantages of conventional aqueous paints because of the presence of water therein.

Other objects, features and advantages of the present invention will become more apparent in the following description and from the appended claims.

It has now been found that desired effects of levelling agents for use in aqueous paints can be achieved by the use of copolymers of a monoethylenically alpha, beta-unsaturated carboxylic acid or anhydride thereof and an alkyl acrylate or alkyl metharcylate having in each case from 1 to 18 carbon atoms in the alkyl moiety, the copolymers having an average molecular weight of from about 2,000 to 80,000, preferably from about 10,000 to 40,000, and an acid value of from about 30 to 200, preferably from about 50 to 100, in which their carboxyl groups are completely or substantially completely neutralized with a base.

The content of the carboxylic acid units in the copolymers may be from about 5 to 40% by weight, preferably from about 9 to 20% by weight, based on the weight of the copolymers in case of the caboxylic acid units being of a monobasic carboxylic acid. When the carboxylic acid units are of a dibasic carboxylic acid, the content may be from about 2.5 to 20% by weight, preferably from about 4.5 to 10% by weight.

The monoethylenically alpha, beta-unsaturated carboxylic acid include a mono- or dicarboxylic and having a polymerizable double bond between their alpha and beta-carbon atoms and having from 3 to 12, preferably from 3 to 6, carbon atoms. Examples of the carboxylic acids are acrylic, crotonic, isocrotonic, methacrylic, angelinic, tiglic, 2-pentenic, alpha-ethylacrylic, beta-methylcrotonic, 2-hexenic, alpha-ethylcrotonic, maleic, fumaric, itaconic, citraconic and mesaconic acid. When the carboxylic acids are dibasic carboxylic acids, they may be in the form of anhydrides. The carboxylic acids may be used alone or in combination. The alkyl moiety of the alkyl acrylate and methacrylate is any alkyl group, unbranched or branched, having from 1 to 18, preferably from 2 to 12, more preferably from 4 to 8, carbon atoms and it may include, for example, methyl, ethyl, n-propyl, isopropyl, n-butyl, isobutyl, sec-butyl, tert-butyl, n-amyl, isoamyl, hexyl, 21 -ethylhexyl, heptyl, octyl, capryl, nonyl, decyl, undecyl, lauryl, tridecyl, myristyl, pentadecyl, cesyl and cetyl. The alkyl acrylate and the alkyl methacrylate may be used alone or in combination.

The copolymers of the monoethylenically alpha, beta-unsaturated carboxylic acids may be prepared by means of conventional solution polymerization in which a hydrophillic solvent such as an alcohol, e.g., ethanol, isopropyl alcohol or butanol, a cellosolve, e.g., butyl cellosolve or cellosolve acetate, or an ether, e.g., carbitol, may be employed. The monoethylenically alpha, beta-unsaturated carboxylic acid may be used in an amount of from about 5 to 50% by weight with respect of the total weight of the mixture of the two constituents. A polymerization initiator may also be used and it may be a radical initiator customarily used for this purpose, such as benzoyl peroxide, azobisisobutyronitrile or cumene hydroperoxide. The polymerization initiator may be employed in an amount of from about 0.5 to 2% by weight with respect to the total weight of the monomers. The solution polymerization may be generally effected at a temperature of 70° to 110° C. The application of too low a temperature is not appropriate because it may result in excessive copolymerization and require a prolonged reaction time. The application of too high a temperature is not desired because it may present difficulty in adjusting the reaction temperature and result in the formation of a copolymer having too low a copolymerization degree. The polymerization time may range from about 3 to 5 hours. In order to facilitate the adjustment of the reaction temperature, it is preferable to add dropwise to said solvent an appropriate amount of said polymerization initiator in the form of a solution in said monomers.

The thus prepared copolymers are not necessarily required to be separated from the reaction mixture for use in the present invention. In other words, the reaction mixture, i.e., the solution of the copolymers in the reaction medium, may be employed as such with or without previous control of the concentration of the copolymers therein, for instance, to about 50% by weight. When the copolymers are once separated from the reaction mixture, they are usually redissolved into an appropriate solvent to make a solution, which is then used in this invention.

The copolymers possess an average molecular weight of from about 2,000 to 80,000 and an acid value of from about 30 to 200. Copolymers having a lower average molecular weight may not exhibit a viscosity to such an extent as needed for levelling agents. The viscosity of copolymers with an average molecular weight greater than the said upper limit may be too high to defoam and such copolymers may not have a sufficient compatibility with aqueous paints, thereby causing defects on the coating surface such as craters or cissing when applied. Where the acid value of a copolymer is lower than said lower limit, is solubility in water may be insufficient when used for the neutralization of the carboxyl groups of the copolymer with a base, as will be described in more detail hereinbelow. Conversely, a copolymer having an acid value greater than the said upper limit may possess such a high compatibility with water that it can not maintain a surface tension needed for levelling agents.

The levelling agent of the present invention is prepared from the copolymers having said properties by treatment with a base, thereby completely or substantially completely neutralizing the carboxyl groups of the copolymer. The base may be an inorganic or organic base such as, for example, a primary, secondary or tertiary amine, e.g., monomethylamine, monoethylamine, dimethylamine, triethylamine, ethylene diamine, diethylene triamine, triethylene tetramine, monoethanolamine, N-methylethanolamine, dimethylethanolamine or triethanolamine, an alkali metal hydroxide, e.g., sodium hydroxide or potassium hydroxide, or ammonia. Of the amines, a tertiary amine is preferred. If an aqueous paint contains a base in an amount sufficient to neutralize the carboxyl groups of the copolymer to a satisfactory extent, no addition of such a base is any longer necessary and the copolymer may be used as such.

Although the levelling agents of the present invention may be applied to aqueous paints of a type apt to dry at ambient temperature, their application to aqueous paints of a type to bake at elevated temperature, i.e., those comprising crosslinking agents, is particularly advantageous. The levelling agent may be used in such an amount that the weight of the copolymer ranges from about 0.1 to 4%, preferably from about 0.2 to 1%, based on the total weight of an aqueous paint prepared for application. This aqueous paint results in a coating having no undesirable surface defects such as craters or cissing, and having improved surface gloss. The coating surface can also possess properties appropriate for recoating an aqueous paint thereon. The addition of the levelling agent can prevent or decrease the flooding phenomenon to a considerable extent because of inreased wettability on the part of the pigments.

The following Examples serve to illustrate the present invention without, however, limiting the same thereto. In the following Examples, part or parts mean part or parts by weight.

EXAMPLE 1

50 parts of butyl cellosolve were introduced into a four-necked flask equipped with a stirrer, condenser and a dropping funnel and heated to 90° C. A mixture of 44 parts of n-butyl acrylate, 6 parts of acrylic acid and 0.5 part of benzoyl peroxide was added dropwise thereto over a period of 3 hours through the dropping funnel, while being stirred. The mixture was stirred for another 2 hours at 90° C. for the completion of polymerization. To this was added dropwise a mixture of 12.4 parts of triethanolamine and 10 parts of deionized water over a period of 30 minutes while being stirred at 90° C., and the mixture was stirred for another 30 minutes at the same temperature, thereby resulting in the completion of neutralization. The resulting copolymer solution was found to contain 51 weight percent solids. It was also found that the copolymer prior to neutralization had an average molecular weight of 17,960 (when measured by the GPC method) and an acid value of 66.

EXAMPLE 2

40 parts of butyl cellosolve were heated at 80° C. in the same manner as in Example 1. A mixture of 33.5 parts of 2-ethylhexyl acrylate, 14.5 parts of acrylic acid and 0.5 part of benzoyl peroxide was added dropwise thereto over a period of 3 hours while being stirred. The mixture was stirred for another 2 hours at 80° C. The resulting copolymer was found to have an acid value of 158 and an average molecular weight of 24,999.

The copolymer was then treated by adding dropwise thereto 20 parts of triethylamine over a period of 30 minutes while being stirred and maintained at 80° C. The mixture was stirred for another 30 minutes at the same temperature. The resulting copolymer solution was found to contain 45 weight percent solids.

COMPARATIVE EXAMPLE 1

31.5 parts of 2-ethylhexyl arcylate, 18.5 parts of acrylic acid and 0.5 part of benzoyl peroxide were polymerized in the same manner as in Example 2, thereby resulting in a copolymer having an acid value of 205 and an average molecular weight of 25.600. The copolymer was further treated with 25.7 parts of triethylamine as in Example 2. This gave a copolymeric solution having 43.1 weight percent solids.

COMPARATIVE EXAMPLE 2

47.9 parts of 2-ethylhexyl acrylate, 2.1 parts of acrylic acid and 0.5 part of benzoyl peroxide were polymerized by the procedure employed in Example 2, thereby giving a copolymer with an acid value of 23.2 and an average molecular weight of 22,210. The copolymer was then treated with 2.9 parts of triethylamine as in Example 2. This resulted in the formation of a copolymeric solution having 53.8 weight percent solids.

EXAMPLE 3

42.7 parts of 2-ethylhexyl acrylate, 7.3 parts of acrylic acid and 0.5 part of benzoyl peroxide were polymerized by the method used in Example 2, thereby resulting in a copolymer having an acid value of 80 and an average molecular weight of 23,980. The copolymer was then treated with 10.1 parts of triethylamine in the same manner as in Example 2. This gave a copolymer solution having 50.0 weight percent solids.

EXAMPLE A

An aqueous paint was formulated by adding 1.0 part of the copolymeric solution prepared in Example 1 to a blue enamel having the following composition (parts by weight):

| | |
|---|---|
| Water-soluble, oil-free polyester resin ("EPOKY XY-616", trade mark Mitsui Toatsu Chemicals, Inc.) | 100 |
| Water-soluble melamine resin (Mitsui Toatus Chemicals, Inc.) | 17 |
| Amyl alcohol | 11 |
| Titanium oxide | 75 |
| Phthalocyanine Blue | 15 |
| Phthalocyanine Green | 10 |

COMPARATIVE EXAMPLE A

For the comparative example, an aqueous paint was prepared by formulating the said blue enamel composition used in Example A.

COMPARATIVE EXAMPLE B

An aqueous paint was prepared by formulating the blue enamel composition used in Example A and 0.3 part by weight of a silicone resin ("TORAY SILICONE SH 28," trade mark of Toray Silicone K.K.).

EXAMPLE B

An aqueous paint was prepared by adding 1.0 part by weight of the copolymer solution of Example 2 to a white enamel having the following composition and diluting the product with deionized water so as to amount to a viscosity

| | |
|---|---|
| Water-soluble, thermosetting acrylic resin ("Arrolon 557N", trade mark of Nichi-Doku Arrow K.K.) | 100 |
| Water-soluble melamine resin ("Nikalac MW-30", trade mark of Nippon Carbide K.K.) | 17 |
| Titanium oxide | 46 |

COMPARATIVE EXAMPLE C

An aqueous paint was prepared by formulating the white enamel composition used in Example B.

COMPARATIVE EXAMPLE D

An aqueous paint was prepared by adding 0.2 part by weight of the silicone resin employed in Comparative Example B to the composition employed in Example B, instead of the levelling agent used therein.

COMPARATIVE EXAMPLE E

An aqueous paint was prepared by adding to the white enamel composition used in Example B 1.0 part by weight of the levelling agent of Comparative Example 1, instead of the levelling agent used therein.

COMPARATIVE EXAMPLE F

An aqueous paint was prepared in the same manner as in Example B except for the use of the levelling agent of Comparative Example 2 instead of the one used in Example B.

EXAMPLE C

An aqueous paint was prepared in the same manner as in Example B except for the use of the levelling agent of Example 3 instead of the one used in Example B.

RUN I

A clean tin plate was sprayed with the aqueous paint of Example A by means of a percolator so as to result in a dry coating thickness of 20 microns. The coating was baked for 1 minute at 250° C.

The resulting product was observed for evaluation. The results are shown in Table 1.

RUN II

The aqueous paint of Comparative Example A was applied to a clean tin plate in the same manner as in Run I. The results are shown in Table 1.

RUN III

The aqueous paint of Comparative Example B was applied in the same manner as in Run II. The results are set out in Table 1.

RUN IV

A clean tin plate was sprayed with the aqueous paint of Example B so as to result in a dry coating thickness of 20 microns. The coating was left to stand for 10 minutes at room temperature and baked for 30 minutes at 140° C. The results are shown in Table 2.

RUN V

The aqueous paint of Comparative Example C was applied to a clean tin plate in the same manner as in Example B. The results are shown in Table 2.

RUN VI

The aqueous paint of Comparative Example D was applied in the same manner as in Run V. The results are set out in Table 2.

RUNS VII through IX

The aqueous paints of Comparative Example E and F and Example C were applied respectively in the same manner as in Run IV. The results are shown in Table 3.

Table 1

| Performance evaluation | Run Nos. | | |
|---|---|---|---|
| | I | II | III |
| Formation of craters | None | Abundant | None |
| Surface gloss | Excellent | Poor | Fairly good |
| Peeling-off | None | Much | None |
| Flooding | None | Much | Significant |
| Re-coating | Excellent | Good | Poor |

Table 2

| Performance evaluation | Run Nos. | | |
|---|---|---|---|
| | IV | V | VI |
| Formation of craters | None | Abundant | None |
| Surface gloss | Excellent | Poor | Fairly good |
| Peeling-off | None | Much | None |
| Re-coating | Excellent | Good | Poor |

Table 3

| Performance evaluation | Run Nos. | | |
|---|---|---|---|
| | VII | VIII | IX |
| Formation of craters | Much | Much | None |
| Surface gloss | Fairly good | Poor | Excellent |
| Peeling-off | Fairly good | Poor | Excellent |

It is to be noted from Table 3 that the levelling agents having an acid value outside the specified range can not provide a good surface performance on the coating of the aqueous paints.

What is claimed is:

1. A method for imparting to an aqueous paint composition the ability to substantially avoid cissing of, and formation of craters in, coatings of the composition applied to a substrate, which comprises incorporating in the composition a copolymer of a monoethylenically, alpha, beta-unsaturated monobasic or dibasic carboxylic acid and an alkyl acrylate or alkyl methacrylate having in each case from 1 to 18 carbon atoms in the alkyl moiety, in an amount of from about 0.1 to 4% by weight based on the weight of the composition, the copolymer having an average molecular weight of from about 2,000 to 80,000 when determined by gel permeation chromatography, and an acid value of from about 30 to 200, the content of the carboxylic acid units in the copolymer being from about 5 to 40% by weight based on the weight of the copolymer in the case of the monobasic carboxylic acid, or from about 2.5 to 20% by weight based on the weight of the copolymer in the case of the dibasic carboxylic acid, the carboxyl groups of the copolymer being completely or substantially completely neutralized with a base.

2. A method according to claim 1, wherein the content of the carboxylic acid units in the copolymer is from about 9 to 20% by weight based on the weight of the copolymer in the case of the monobasic carboxylic acid, or from about 4.5 to 10% by weight based on the weight of the copolymer in the case of the dibasic carboxylic acid.

3. A method according to claim 1, wherein the copolymer has an average molecular weight of from about 10,000 to 40,000 and an acid value of from about 50 to 100.

4. A method according to claim 1, wherein the base is a primary, secondary or tertiary amine, an alkali metal hydroxide, or ammonia.

5. A method according to claim 1, wherein the base is monomethylamine, monoethylamine, dimethylamine, triethylamine, ethylene diamine, diethylene triamine, triethylene tetramine, monoethanolamine, N-methylethanolamine, dimethylethanolamine, triethanolamine, sodium hydroxide, potassium hydroxide or ammonia.

6. A method according to claim 1, wherein the copolymer is a copolymer of the monobasic or dibasic carboxylic acid and the alkyl acrylate having in its alkyl moiety from 1 to 18 carbon atoms.

7. A method according to claim 6, wherein the alkyl moiety is an unbranched or branched alkyl group.

8. A method according to claim 7, wherein the alkyl group is methyl, ethyl, n-propyl, isopropyl, n-butyl, isobutyl, sec-butyl, tert-butyl, n-amyl, isoamyl, hexyl, 2-ethylhexyl, heptyl, octyl, capryl, nonyl, decyl, undecyl, lauryl, tridecyl, myristyl, pentadecyl, cesyl or cetyl.

9. A method according to claim 1, wherein the carboxylic acid has from 3 to 12 carbon atoms.

10. A method according to claim 9, wherein the carboxylic acid is acrylic acid, crotonic acid, isocrotonic acid, methacrylic acid, angelinic acid, tiglic acid, 2-pentenic acid, alpha-ethylacrylic acid, beta-methylcrotonic acid, 2-hexenic acid, alpha-ethylcrotonic acid, maleic acid, fumaric acid, itaconic acid, citraconic acid or mesaconic acid.

11. A method according to claim 1, wherein the copolymer is a copolymer of the monobasic or dibasic carboxylic acid and the alkyl methacrylate having in its alkyl moiety from 1 to 18 carbon atoms.

12. A method according to claim 11, wherein the alkyl group is methyl, ethyl, n-propyl, isopropyl, n-butyl, isobutyl, sec-butyl, tert-butyl, n-amyl, isoamyl, hexyl, 2-ethylhexyl, heptyl, octyl, capryl, nonyl, decyl, undecyl, lauryl, tridecyl, myristyl, pentadecyl, cesyl or cetyl.

13. An aqueous paint capable of being baked at an elevated temperature, having incoporated therein a copolymer of a monoethylenically, alpha, beta-unsaturated monobasic or dibasic carboxylic acid and an alkyl acrylate or alkyl methacrylate having in each case from 1 to 18 carbon atoms in the alkyl moiety, in an amount of from about 0.1 to 4% by weight based on the weight of the paint, the copolymer having an average molecular weight of from about 2,000 to 80,000 when determined by gel permeation chromatography, and an acid value of from about 30 to 200, the content of the carboxylic acid units in the copolymer being from about 5 to 40% by weight based on the weight of the copolymer in the case of the monobasic carboxylic acid, or from about 2.5 to 20% by weight based on the weight of the copolymer in the case of the dibasic carboxylic acid, the carboxyl groups of the copolymer being completely or substantially completely neutralized with a base.

* * * * *